(12) United States Patent
Tsirkin (10) Patent No.: US 9,563,569 B2
(45) Date of Patent: Feb. 7, 2017

(54) MEMORY TRANSFORMATION IN VIRTUAL MACHINE LIVE MIGRATION

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

(*) Notice: Subject to any disclaimer, the term of this patent is extended or adjusted under 35 U.S.C. 154(b) by 157 days.

(21) Appl. No.: 14/166,533

(22) Filed: Jan. 28, 2014

(65) Prior Publication Data

US 2015/0212948 A1    Jul. 30, 2015

(51) Int. Cl.
*G06F 12/1009* (2016.01)
*G06F 12/10* (2016.01)
*G06F 9/455* (2006.01)

(52) U.S. Cl.
CPC ....... *G06F 12/1009* (2013.01); *G06F 9/45558* (2013.01); *G06F 2009/4557* (2013.01); *G06F 2212/151* (2013.01); *G06F 2212/152* (2013.01); *G06F 2212/657* (2013.01)

(58) Field of Classification Search
CPC .................. G06F 9/45558; G06F 2009/45562; G06F 2009/45583; G06F 2009/4557; G06F 2009/45579
See application file for complete search history.

(56) References Cited

U.S. PATENT DOCUMENTS

| | | |
|---|---|---|
| 7,072,919 B2 | 7/2006 | Sexton et al. |
| 8,316,374 B2 | 11/2012 | Lim et al. |
| 8,490,091 B2 | 7/2013 | Bozek et al. |
| 8,549,519 B2 | 10/2013 | Emaru |
| 2009/0132804 A1 | 5/2009 | Paul et al. |
| 2011/0202765 A1 | 8/2011 | McGrane et al. |
| 2011/0283256 A1 | 11/2011 | Raundahl Gregersen et al. |
| 2011/0302577 A1 | 12/2011 | Reuther et al. |

(Continued)

OTHER PUBLICATIONS

Jui-Hao Chiang, "Optimization Techniques for Memory Virtualization-based Resource Management", Stony Brook University, Dec. 2012 152 Pages http://www.ecsl.cs.sunysb.edu/tr/TR253_thesis.pdf.

(Continued)

*Primary Examiner* — Ryan Bertram
*Assistant Examiner* — Tracy Chan
(74) *Attorney, Agent, or Firm* — Lowenstein & Sandler LLP (57) ABSTRACT

Systems and methods for lazy memory transformation in virtual machine live migration. An example method may comprise: receiving, by a computer system, a plurality of transformed memory blocks, each transformed memory block comprising one or more memory pages mapped into an address space of a virtual machine being migrated to the computer system; storing, in a memory data structure, one or more mappings, each mapping comprising a guest virtual address of a memory page and an identifier of a transformed memory block containing the memory page; responsive to detecting an access to a memory page by the virtual machine, identifying, using the memory data structure, a transformed memory block containing the memory page being accessed; and storing in a memory mapped into the address space of the virtual machine the memory page produced by performing a reverse transformation of the transformed memory block.

18 Claims, 4 Drawing Sheets

(56) References Cited

U.S. PATENT DOCUMENTS

| | | | |
|---|---|---|---|
| 2012/0023494 A1 | 1/2012 | Harrison et al. | |
| 2012/0221744 A1* | 8/2012 | Heywood | G06F 9/4862 709/247 |
| 2012/0311569 A1 | 12/2012 | Shah | |
| 2013/0073823 A1* | 3/2013 | Hunter | G06F 9/45533 711/162 |
| 2013/0097392 A1 | 4/2013 | Arges et al. | |
| 2013/0139155 A1 | 5/2013 | Shah | |
| 2013/0151846 A1 | 6/2013 | Baumann et al. | |
| 2013/0191648 A1 | 7/2013 | Bursell | |
| 2013/0227551 A1 | 8/2013 | Tsirkin | |
| 2014/0052926 A1* | 2/2014 | Devendran | G06F 12/1009 711/136 |

OTHER PUBLICATIONS

"What is Elastic Memory for Java?", VMware, Inc. http://pubs.vmware.com/vfabric5/index.jsp?topic=/com.vmware.vfabric.tc-server.2.6/em4j/em4j-about.html, last accessed Oct. 16, 2013.

Irene Zhang, et al., "Optimizing VM Checkpointing for Restore Performance in VMware ESXi", University of Washington; MIT CSAIL; VMware; CloudPhysics; 12 Pages http://homes.cs.washington.edu/~iyzhang/papers/vmrestore-atc13.pdf last accessed Feb. 3, 2014.

Svard, Petter, et al., "Evaluation of Delta Compression Techniques for Efficient Live Migration of Large Virtual Machines", Dept. of Computing Science, Umea University; SAP Research CEC Belfast SAP (UK) Limited, University of Ulster, 11 pages.

Thread: Hypervisor Migration, Knowledge Center, Citrix Systems, Inc., 1999-2013, 2 pages.

Tsirkin, Michael "Tracking Transformed Memory Pages In Virtual Machine Chain Migration", U.S. Appl. No. 14/166,498, filed Jan. 28, 2014.

USPTO Office Action for U.S. Appl. No. 14/166,498, mailed Sep. 9, 2015.

USPTO, Office Action for U.S. Appl. No. 14/166,498, mailed Dec. 31, 2015.

* cited by examiner

MEMORY TRANSFORMATION IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for implementing lazy memory transformation in virtual machine live migration. "Memory transformation" herein shall refer to applying one or more transformation methods, including compression, encryption, and/or encoding, to a memory block comprising one or more memory pages.

"Live migration" herein shall refer to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

Hence, the destination hypervisor may receive the virtual machine execution state over the network and store the execution state into the host memory mapped into the virtual machine address space. In an illustrative example, memory blocks comprised by the virtual machine execution states may be transformed (e.g., compressed and/or encrypted) before being transmitted over the network to the destination host.

"Transformed memory block" herein shall refer to a plurality of memory pages to which a transformation function has been applied. Examples of transformation functions include compression, encryption, and/or encoding. For each transformation function, a corresponding reverse transformation function may be defined (e.g., de-compression, decryption, and/or decoding).

In conventional systems, responsive to receiving a transformed memory block, the destination host migration agent may immediately reverse the transformation to produce one or more untransformed memory pages stored in the host memory, and map the memory pages into the virtual machine address space. All the above described operations may be superfluous if the virtual machine never accesses the received memory pages. Hence, in accordance with one or more aspects of the present invention, the processing efficiency at the receiving host may be optimized by excluding the superfluous reverse transformation and memory mapping operations through implementing lazy memory transformation with respect to the incoming memory blocks, as described in more details herein below.

In an illustrative example, responsive to receiving a transformed memory block comprising one or more virtual machine memory pages, the destination hypervisor may store in the host memory, for each memory page contained in the transformed memory block, a mapping of the memory page address to the identifier of the transformed memory block stored in the host memory, without performing the reverse transformation of the transformed memory block.

Later, when a memory page comprised by the transformed memory block is accessed by the virtual machine, the hypervisor may intercept the memory page access attempt, perform the reverse transformation of at least part of the transformed memory block containing the memory page, and store the memory page into a memory location mapped into the virtual machine address space, as described in more details herein below.

Various aspects of the above referenced methods and systems are described in details herein below by way of examples, rather than by way of limitation.

Figure 1:
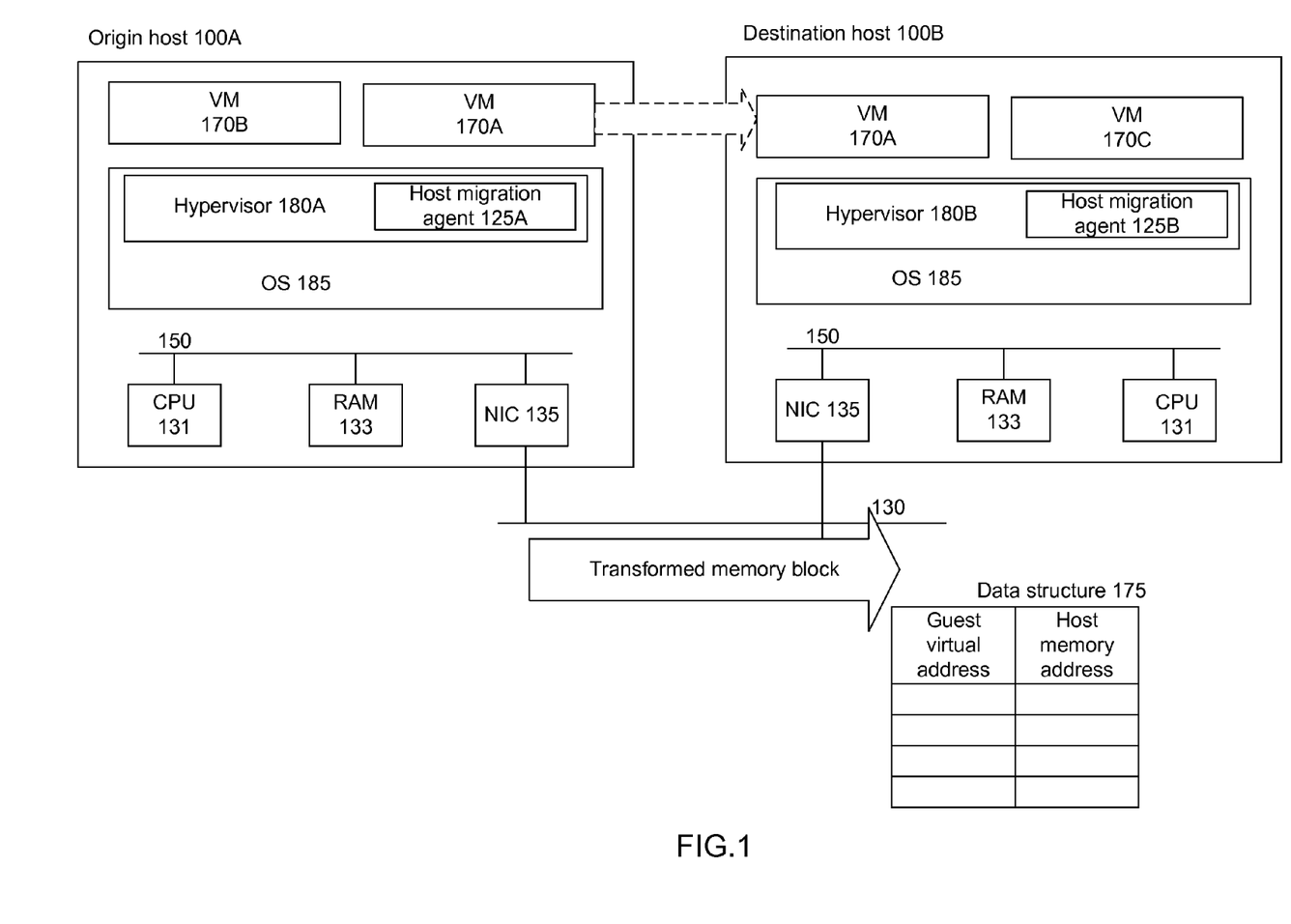
FIG. 1 schematically illustrates a high-level component diagram of one illustrative embodiment of a distributed computer system, in accordance with one or more aspects of the present disclosure.

FIG. 1 depicts a high-level component diagram of one illustrative example of a distributed computer system in accordance with one or more aspects of the present disclosure. "Computer system" herein shall refer to a system comprising one or more processors, one or more memory devices, and one or more input/output (I/O) interfaces. A distributed computer system may comprise one or more computer systems interconnected by one or more networks.

Computer system 100A, 100B may be interconnected, via a network 130, with one or more remote computers. Computer system 100A, 100B may comprise one or more processors 131 communicatively coupled to a memory device 133 and a network interface controller (NIC) 135. Local connections within host computer system 100A, 100B, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data.

In an illustrative example, as schematically illustrated by FIG. 1, computer system 100A, 100B may run multiple virtual machines 170 by executing a software layer 180, often referred to as "hypervisor," above the hardware and below the virtual machines. In certain implementations, hypervisor 180 may be a component of operating system 185 executed by host computer system 100A, 100B. Alternatively, hypervisor 180 may be provided by an application running under host operating system 185, or may run directly on the host computer system 100A without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agents 125A, 125B running on host computer systems 100A, 100B may perform virtual machine migration management functions in accordance with one or more aspects of the present disclosure. In certain implementations, a host migration agent may be implemented as a software component invoked by hypervisor 180. Alternatively, functions of host migration agent 125 may be performed by hypervisor 180.

The address space virtualization may be handled through the paging mechanism designed to implement a virtual machine address space with a smaller amount of random access memory (RAM) and some backing store. The memory may be divided into pages of a defined size (e.g., 4 KB) which may be stored either in RAM or on the disk. The host operating system may maintain a page directory and a set of page tables to keep virtual to physical address mappings. When a virtual machine attempts to access a memory page, the processor may use the page directory and page tables to translate the virtual address into a physical address. If the page being accessed is not currently in the physical memory, the processor may generate a page-fault exception, responsive to which the host operating system may then read the page from the backing store into the physical memory and continue executing the thread.

"Page table" herein shall refer to a memory structure facilitating translation of virtual memory addresses to physical memory addresses. In an illustrative example, a page table maintained by a host computer system may include a plurality of page table entries corresponding to a plurality of memory pages mapped into the virtual address space of a virtual machine running on the host computer system. Each page table entry may represent a mapping of a virtual address of a memory page to the physical address of a corresponding physical frame. In certain implementations, each page table entry may comprise a valid bit indicating whether the memory page is currently present in the physical memory frame referenced by the corresponding page table entry.

In an illustrative example, virtual machine 170A may be undergoing live migration from origin host computer system 100A to destination host computer system 100B, as schematically illustrated by FIG. 1. Live migration may involve copying the virtual machine execution state from the origin host to the destination host. The virtual machine execution state may comprise the memory state, the virtual processor state, the virtual devices state, and/or the connectivity state. Host migration agents 125A-125B may manage copying, over network 130, the execution state of migrating virtual machine 170A, including a plurality of memory blocks, from origin host 100A to destination host 100B while virtual machine 170A is still running on origin host 100A. In an illustrative example, memory blocks comprised by the virtual machine execution states may be transformed (e.g., compressed, encrypted, and/or encoded) before being transmitted over the network to the destination host.

A memory block may comprise one or more conventional, "large" or "huge" memory pages. "Large" or "huge" memory page refers to a memory page having the size larger than that of a conventional memory page for a given combination of processor architecture and operating system. In certain implementations, the virtual machine migration methods described herein may operate with memory blocks of one or more fixed sizes and/or variable sizes. In an illustrative example, a memory block may comprise two or more memory pages corresponding to a contiguous guest virtual address range.

To exclude redundant memory transformations by the receiving host with respect to memory pages which may never be accessed by a virtual machine, the receiving host may implement lazy memory transformation with respect to the incoming memory blocks. In an illustrative example, host migration agent 125B running on destination host computer system 100B may receive, from origin host computer system 100A, one or more transformed memory blocks, each comprising one or more virtual machine memory pages.

Responsive to receiving a transformed memory block, the destination host migration agent may store the transformed memory block in the host memory without performing the reverse transformation. The destination host migration agent may further store, in a memory data structure 175, for each memory page contained by the transformed memory block, a mapping of the memory page address to the identifier of the transformed memory block stored in the host memory. In certain implementations, the destination host migration agent may further clear the valid bit of the page table entry corresponding to the virtual memory page, so that an attempt to access the memory page would trigger a page fault intercepted by the hypervisor.

Figure 2:
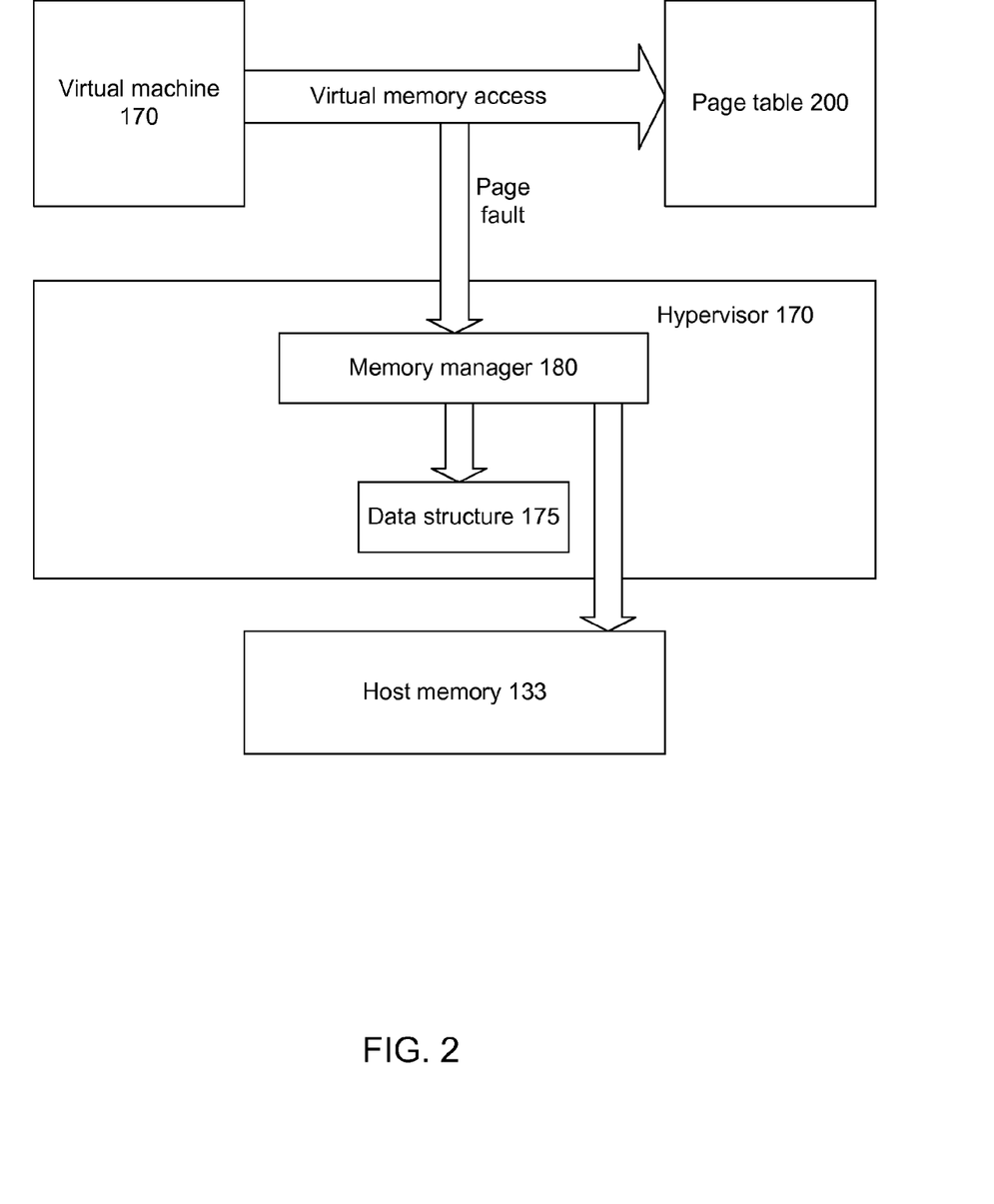
FIG. 2 schematically illustrates an example of lazy memory transformation in virtual machine live migration, in accordance with one or more aspects of the present disclosure.

When the memory page is eventually accessed by the virtual machine, the hypervisor may intercept the page fault triggered by the memory page access attempt and look up in data structure 175 the virtual address of the memory page being accessed, as schematically illustrated by FIG. 2. The hypervisor may then retrieve from data structure 175 the host address of the corresponding transformed memory block, and perform the reverse transformation of at least part of the memory block containing the memory page, e.g., by uncompressing and/or decrypting the memory block. Upon performing the reverse transformation, the hypervisor may store the resulting one or more memory pages in the host memory. The hypervisor may then map the virtual address of the memory page being accessed by the virtual machine to the host address where the memory page has been stored, and set the valid bit of the page table entry corresponding to the memory page. Upon return from the hypervisor call triggered by the page fault, the virtual machine may complete the memory access operation.

Figure 3:
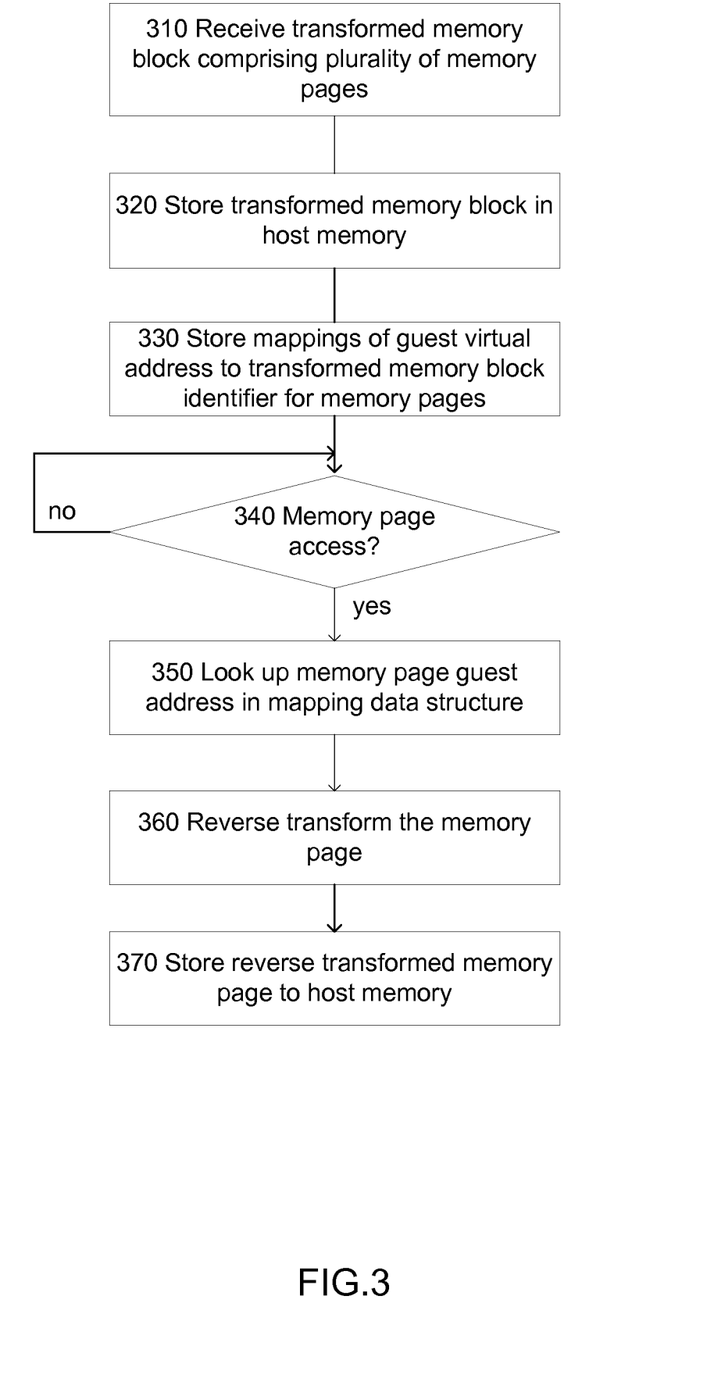
FIG. 3 schematically illustrates a flow diagram of an example method for implementing lazy memory transformation in virtual machine live migration, in accordance with one or more aspects of the present disclosure.

FIG. 3 depicts a flow diagram of an example method 300 for implementing lazy memory transformation in virtual machine live migration. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method (e.g., computer system 100B of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the destination hypervisor may receive, via a network communication interface, one or more transformed (e.g., compressed, encrypted, and/or encoded) memory blocks, each comprising one or more virtual machine memory pages.

Responsive to receiving a transformed memory block, the hypervisor may, at block 320, store the transformed memory block in the host memory.

At block 330, the hypervisor may store in the host memory, for each memory page contained by the transformed memory block, a mapping of the memory page address to the identifier of the transformed memory block stored in the host memory, without performing the reverse transformation of the transformed memory block. Each mapping record may further comprise the memory page offset within the memory block. In certain implementations, the destination host migration agent may further clear the valid bit of one or more page table entries corresponding to the memory pages contained by the memory block, so that an attempt to access the corresponding memory page would trigger a page fault intercepted by the hypervisor.

Responsive to detecting, at block 340, an access to the memory page by the virtual machine, the hypervisor may, at block 350, look up in the memory mapping data structure the virtual address of the memory page being accessed, to retrieve the host address of the corresponding transformed memory block.

At block 360, the hypervisor may perform the reverse transformation of the memory block, e.g., by uncompressing and/or decrypting the memory block.

At block 370, the hypervisor may store the resulting one or more memory pages in the host memory. In certain implementations the hypervisor may further modify the page table entry corresponding to the memory page to map the virtual address of the memory page to the host memory address, and set the valid bit of the page table entry corresponding to the memory page. Upon return from the hypervisor call triggered by the page fault, the virtual machine may complete the memory access operation.

Figure 4:
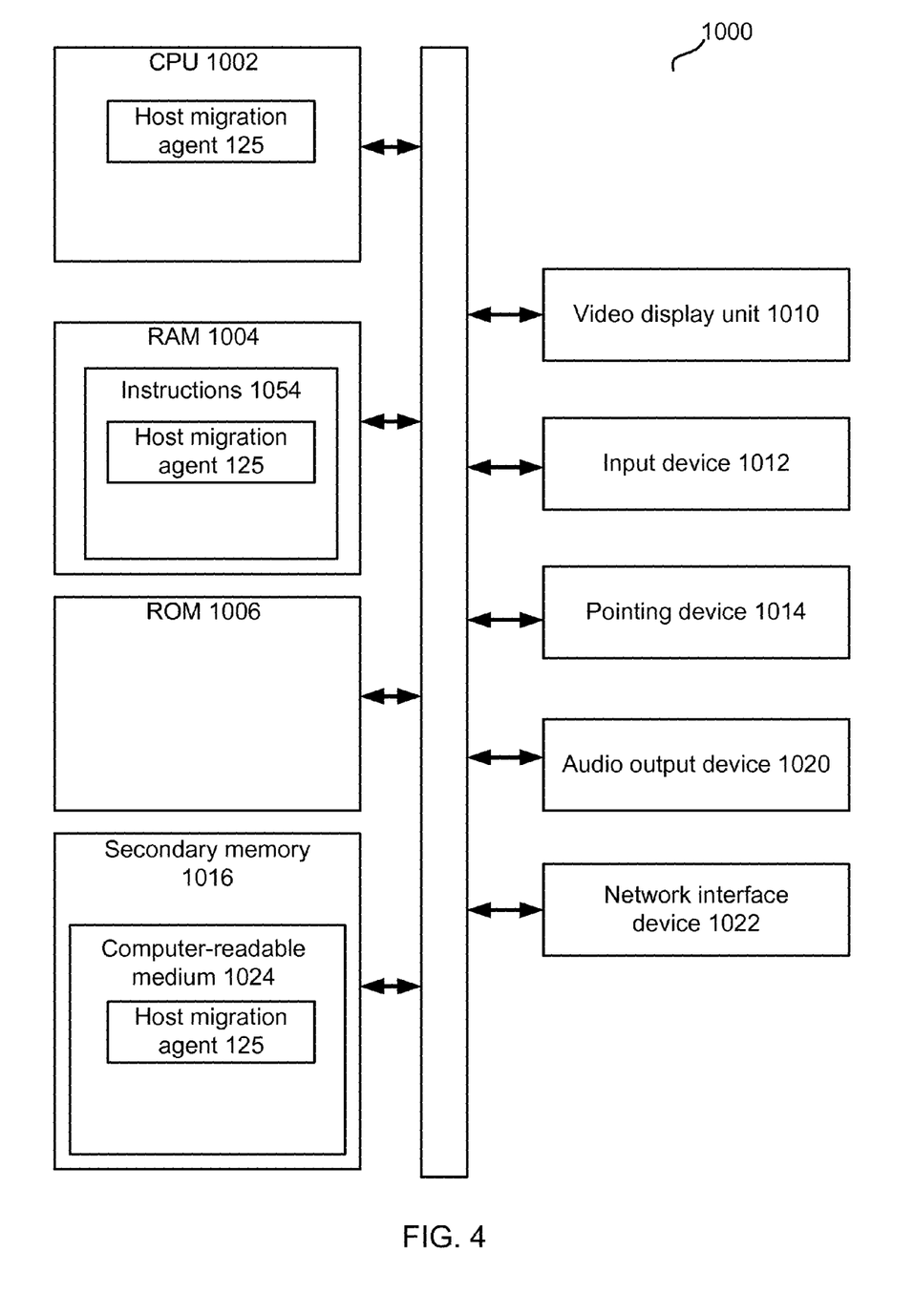
FIG. 4 schematically illustrates a block diagram of an illustrative computer system operating in accordance with the examples of the present disclosure.

FIG. 4 depicts an example computer system 1000 within which a set of instructions, for causing the computer system to perform any one or more of the methods described herein, may be executed. In certain implementations, computer system 1000 may correspond to computer system 100A, 100B of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of host migration agent 125 implementing method 300 for implementing lazy memory transformation in virtual machine live migration. Instructions of host migration agent 125 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
   receiving, by a processor, a plurality of transformed memory blocks, each transformed memory block comprising one or more memory pages mapped into an address space of a virtual machine being migrated to a computer system associated with the processor;
   storing, in a memory data structure, a mapping comprising a guest virtual address of a memory page and an identifier of a transformed memory block containing the memory page;
   responsive to detecting an access to the memory page by the virtual machine, identifying, using the memory data structure, the transformed memory block containing the memory page being accessed;
   storing, by the processor, in a memory mapped into the address space of the virtual machine, the memory page produced by performing a reverse transformation of the transformed memory block; and
   removing the mapping from the memory data structure responsive to performing the reverse transformation of the transformed memory block.

2. The method of claim 1, wherein a transformed memory block is provided by at least one of: a compressed memory block, an encrypted memory block, or an encoded memory block.

3. The method of claim 1, wherein storing a mapping comprises clearing a valid bit of a page table entry for the memory page.

4. The method of claim 3, wherein storing the memory page in the memory mapped into the address space of the virtual machine comprises setting the valid bit of a page table entry for the memory page.

5. The method of claim 3, wherein detecting the access to the memory page by the virtual machine comprises intercepting a page fault.

6. The method of claim 1, wherein the identifier of the transformed memory block comprises an address of the transformed memory block in a memory of the computer system.

7. A computer system, comprising:
   a memory to store a memory data structure; and
   a processor, operatively coupled to the memory, to:
      receive a plurality of transformed memory blocks, each transformed memory block comprising one or more memory pages mapped into an address space of a virtual machine being migrated to the computer system;
      store, in the memory data structure, a mapping comprising a guest virtual address of a memory page and an identifier of a transformed memory block containing the memory page;
      responsive to detecting an access to the memory page by the virtual machine, identify, using the memory data structure, the transformed memory block containing the memory page being accessed;
      store in a memory mapped into the address space of the virtual machine the memory page produced by performing a reverse transformation of the transformed memory block; and
      remove the mapping from the memory data structure responsive to performing the reverse transformation of the transformed memory block.

8. The system of claim 7, wherein a transformed memory block is provided by at least one of: a compressed memory block, an encrypted memory block, or an encoded memory block.

9. The system of claim 7, wherein to store a mapping, the processor is to clear a valid bit of a page table entry for the memory page.

10. The system of claim 9, wherein to store the memory page in the memory mapped into the address space of the virtual machine, the processor is to set the valid bit of a page table entry for the memory page.

11. The system of claim 9, wherein to detect the access to the memory page by the virtual machine, the processor is to intercept a page fault.

12. The system of claim 7, wherein the identifier of the transformed memory block comprises an address of the transformed memory block in a memory of the computer system.

13. A computer-readable non-transitory storage medium comprising executable instructions that, when executed by a processor, cause the processor to:
  receive, by the processor, a plurality of transformed memory blocks, each transformed memory block comprising one or more memory pages mapped into an address space of a virtual machine being migrated to a computer system associated with the processor;
  store, by the processor, in a memory data structure, a mapping comprising a guest virtual address of a memory page and an identifier of a transformed memory block containing the memory page;
  responsive to detecting an access to the memory page by the virtual machine, identify, using the memory data structure, the transformed memory block containing the memory page being accessed;
  store, by the processor, in a memory mapped into the address space of the virtual machine, the memory page produced by performing a reverse transformation of the transformed memory block; and
  remove the mapping from the memory data structure responsive to performing the reverse transformation of the transformed memory block.

14. The computer-readable non-transitory storage medium of claim 13, wherein a transformed memory block is provided by at least one of: a compressed memory block, an encrypted memory block, or an encoded memory block.

15. The computer-readable non-transitory storage medium of claim 13, wherein executable instructions causing the processor to store a mapping comprise executable instructions causing the processor to clear a valid bit of a page table entry for the memory page.

16. The computer-readable non-transitory storage medium of claim 15, wherein executable instructions causing the processor to store the memory page in the memory mapped into the address space of the virtual machine comprise executable instructions causing the processor to set the valid bit of a page table entry for the memory page.

17. The computer-readable non-transitory storage medium of claim 15, wherein executable instructions causing the processor to detect the access to the memory page by the virtual machine comprise executable instructions causing the processor to intercept a page fault.

18. The computer-readable non-transitory storage medium of claim 13, wherein the identifier of the transformed memory block comprises an address of the transformed memory block in a memory of the computer system.

* * * * *